United States Patent [19]

Alexander

[11] Patent Number: 5,781,454
[45] Date of Patent: Jul. 14, 1998

[54] PROCESS MODELING TECHNIQUE

[75] Inventor: Gilbert W. Alexander, Los Angeles, Calif.

[73] Assignee: Raytheon Company, Los Angeles, Calif.

[21] Appl. No.: 618,050

[22] Filed: Mar. 25, 1996

[51] Int. Cl.$^6$ .................................................. G06F 17/60
[52] U.S. Cl. ............................ 364/578; 395/1; 395/500; 364/274
[58] Field of Search ................................. 364/578, 512, 364/274; 395/1, 500

[56] References Cited

U.S. PATENT DOCUMENTS

| | | | |
|---|---|---|---|
| 4,796,194 | 1/1989 | Atherton | 364/468 |
| 5,019,961 | 5/1991 | Allesso et al. | 364/192 |
| 5,291,497 | 3/1994 | Ulrich et al. | 371/19 |
| 5,307,479 | 4/1994 | Ulrich et al. | 395/500 |
| 5,402,367 | 3/1995 | Sullivan et al. | 364/578 |
| 5,442,555 | 8/1995 | Reifman et al. | 364/431.01 |
| 5,490,097 | 2/1996 | Swenson | 364/578 |
| 5,586,021 | 12/1996 | Fargher et al. | 364/468.06 |
| 5,613,041 | 3/1997 | Keeler et al. | 395/23 |

*Primary Examiner*—Kevin J. Teska
*Assistant Examiner*—A. S. Roberts
*Attorney, Agent, or Firm*—Leonard A. Alkov; Glenn H. Lenzen, Jr.

[57] ABSTRACT

A process modeling technique (50) for concurrent processes. The inventive technique is adapted for use with processes having a plurality of activity steps and includes the steps of identifying the activity steps (72); providing incremental data or preliminary information from one of the activity steps (76); determining a data maturity attribute of the incremental data and providing a parameter with respect thereto (78); and feeding forward the incremental data from the activity step to another activity step along with the data maturity attribute parameter (76, 78). In the specific embodiment, the modeling technique (50) of the present invention includes a step (70) of gathering all available information about the process to be modeled. Next (72) the information corresponding to each activity step is represented by a set of data items. Data maturity thresholds are determined for each activity step (74). Subsequently the model is run using a process simulation tool (80).

8 Claims, 2 Drawing Sheets

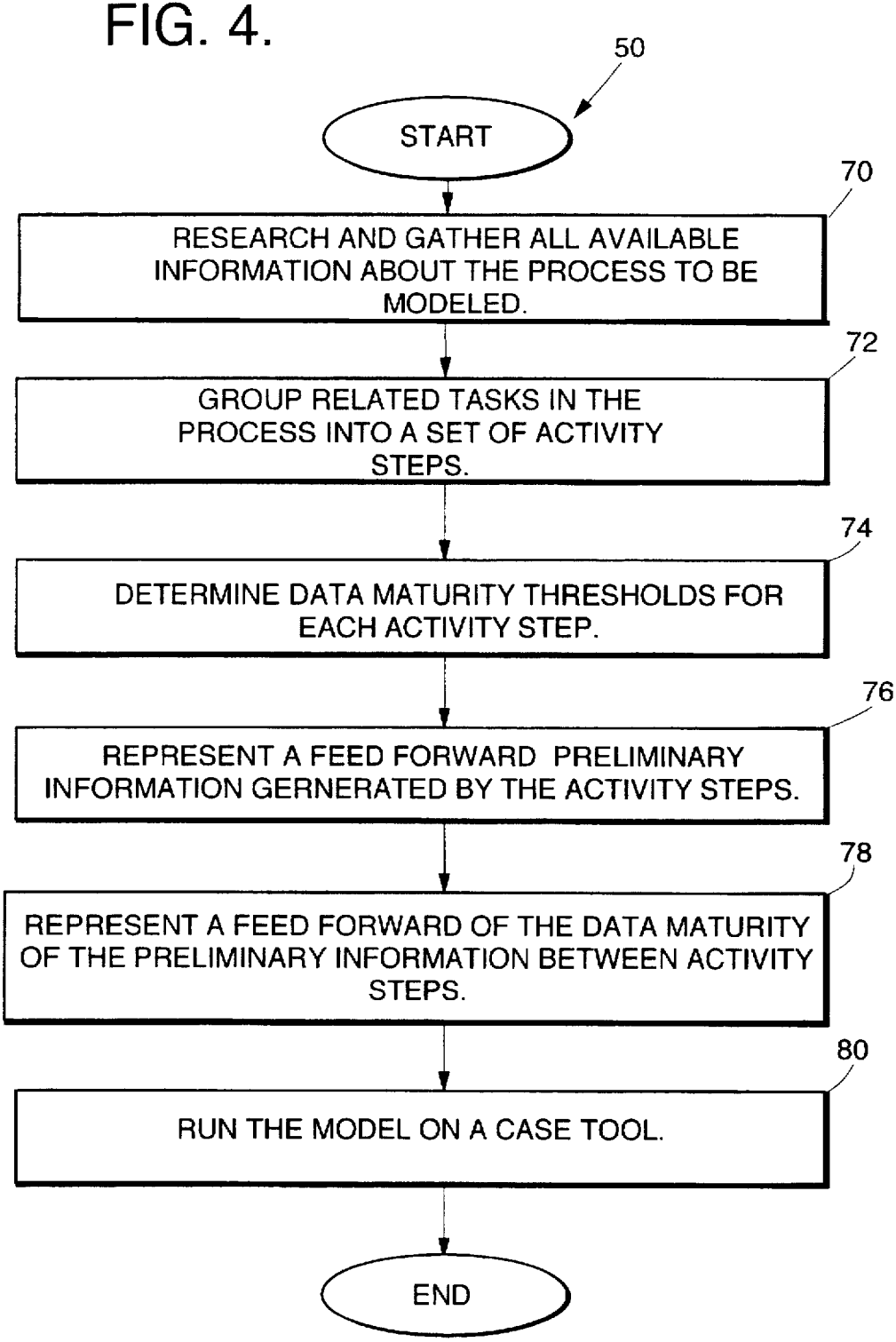

PROCESS MODELING TECHNIQUE

BACKGROUND OF THE INVENTION

1. Field of Invention

This invention relates to manufacturing methods. Specifically, the present invention relates to techniques for modeling processes.

2. Description of the Related Art

A model is a representation of a product or process. Models are particularly useful in the simulation of engineering and manufacturing processes. An accurate model of an engineering or manufacturing process provides useful estimates of time and resources required to achieve an end result. Typically, engineering processes are modeled using a sequential modeling technique called the 'waterfall' approach. In a waterfall model, related tasks are grouped into activity steps and every activity step is completed before subsequent steps are initiated. Completion of a step often involves the generation of documentation, data and a review process. Unfortunately, during an actual process execution within a design group, certain activity steps and processes are performed concurrently. In these 'concurrent processes', incremental or preliminary information is passed informally between individuals and groups working on different activity or process steps prior to the completion of same.

Conventional techniques for modeling concurrent processes ignore the passing of incremental data from one process step to the next and cause a timing error by failing to account for the fact that later process steps can start with incomplete data. These conventional models tend to 'fudge' the time required to complete each step to allow for the passing of incremental data and may not accurately sequence the entry and exit criteria for each step. The result is that managers are not able to evaluate process changes accurately, costing development time and money.

Hence, a need exists in the art for a more accurate process modeling technique for concurrent processes, one which incorporates details with respect to the feed forward of preliminary information.

SUMMARY OF THE INVENTION

The need in the art is addressed by the process modeling technique of the present invention. The inventive technique is adapted for use with processes having a plurality of activity steps and includes the steps of identifying the activity steps; providing incremental data from one of the activity steps; determining a data maturity attribute of the incremental data and providing a variable with respect thereto; and feeding forward the incremental data from the activity step to another activity step along with the data maturity attribute variable.

In the specific embodiment, the simulation technique of the present invention simulates a process and includes storing information about a first and a second activity step in a set of data items. The data items are produced by a primitive, a lowest level activity. The data items are stored in a data maturity file that includes a data item for specifying the completeness of information to be transferred from the first activity step to the second activity step.

In the specific embodiment, the first activity step and the second activity step both include a plurality of activity steps, each having a set of corresponding data items with one data item specifying the completeness of the information stored in all of the data items in the data maturity level file. Each activity step in the entire process is represented by a an activity box, and the flow of data items between the activity steps is represented by an arrow.

A feed forward of preliminary information from the first activity step to the second activity step is described using data items which may be implemented using a standard process modeling software package. The data items are stored in the data maturity level file which includes a data item specifying to the second activity step the completeness of the input data in terms of a percentage to the second activity step.

BRIEF DESCRIPTION OF THE DRAWINGS

FIG. 2a is a more accurate model of the concurrent process modeled in FIG. 1a.

FIG. 2b is a timing diagram illustrating the actual time required to finish the process of FIG. 2a.

FIG. 4 is a flow diagram of a specific implementation of the process modeling technique of the present invention.

DESCRIPTION OF THE INVENTION

Figure 1A:
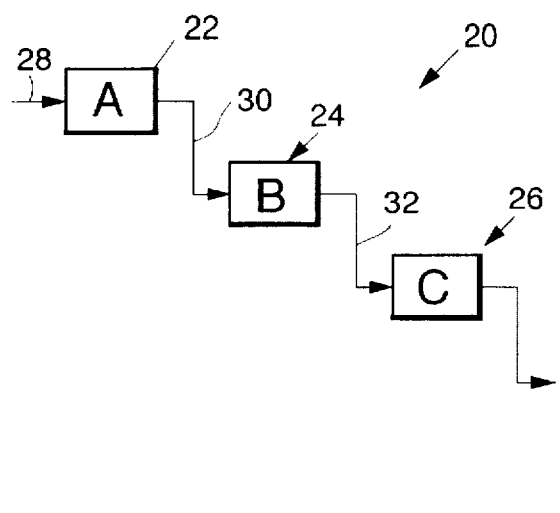
FIG. 1a is an exemplary diagram of a waterfall model of a concurrent process that includes three activity steps in accordance with the teachings of the prior art.

The invention is described below in reference to the accompany drawings in which like reference numerals denote like parts. While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Illustrative embodiments and exemplary applications will now be described with reference to the accompanying drawings to disclose the advantageous teachings of the present invention. The following review of the operation of a traditional process modeling technique is intended to facilitate and understanding of the present invention FIG. 1a is an exemplary diagram of a waterfall model of a concurrent process that includes three activity steps in accordance with the teachings of the prior art. Each output line represents a flow of information. The overall process is represented by a process model 20 and includes a first activity step 22, a second activity step 24, and a third activity step 26. Information representing data and resources required to start the process is input to the first activity step 22.

When the model 20 is used to simulate the process and all of the tasks included in the first activity step 22 are complete, information representing the completed tasks and resources is output from the first activity step 22 to the second activity step 24. The second activity step 24 is then signaled to begin. In accordance with the model, all that is required for the second activity step 24 to complete its task is the complete input supplied by the first output line 30.

Figure 1B:
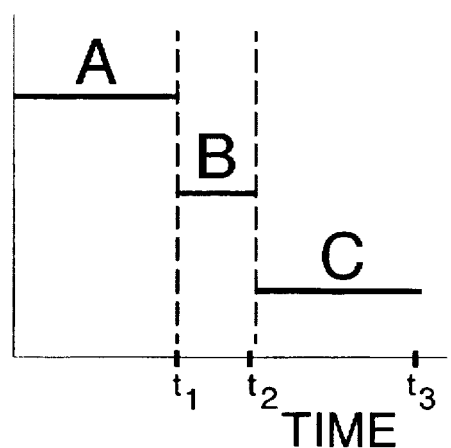
FIG. 1b is a timing diagram illustrating the estimated time required to finish the process of FIG. 1a using a prior art process modeling technique.

FIG. 1b depicts the estimate of the time required to complete the process in accordance with the waterfall model of FIG. 1a. As is typical of a waterfall model, each previous step must be complete before subsequent steps may begin.

Unfortunately, in practice, many processes are in fact concurrent. When using the waterfall technique to model concurrent processes the true concurrent nature of activities is not shown. In practice, there is a sharing of information between people working on different activity steps. Yet this is not shown using the waterfall technique.

Figure 2A:
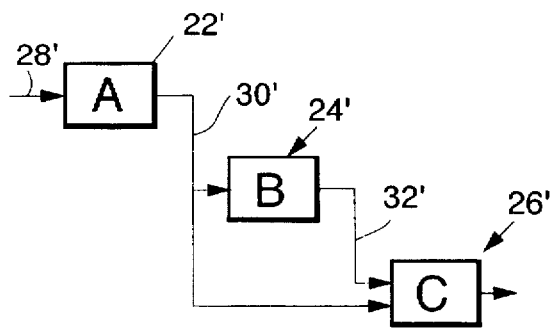
Figure 2B:
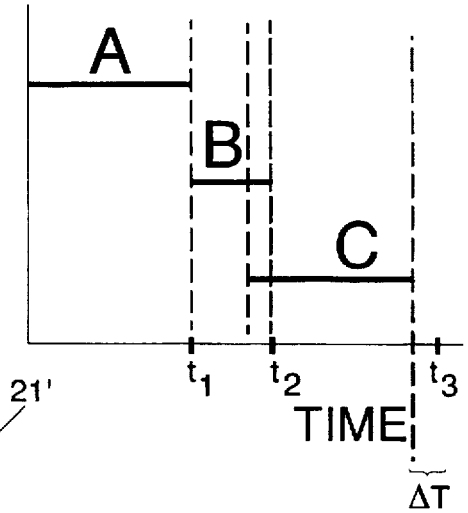

FIG. 2a is a more accurate model of the concurrent process modeled in FIG. 1a. In the model 20' of FIG. 2a, preliminary information from the first activity step 22' is fed forward to the third activity step 26' to represent the 'real life' practice of sharing preliminary information. This allows those working on the third activity step 26' to begin at time $t_s$, instead of time $t_2$ as depicted in the timing diagram of FIG. 2b. Assuming approximately the same time for task completion in either model, then task C (activity step 26') will in actuality, be complete at time $t_p$ which is less than the time $t_3$ predicted by the waterfall model of FIGS. 1a and 1b by an error margin of $\Delta T$. This timing error results in an inaccurate simulation. This makes it difficult to use a simulator for process improvement due to low accuracy.

Figure 3:
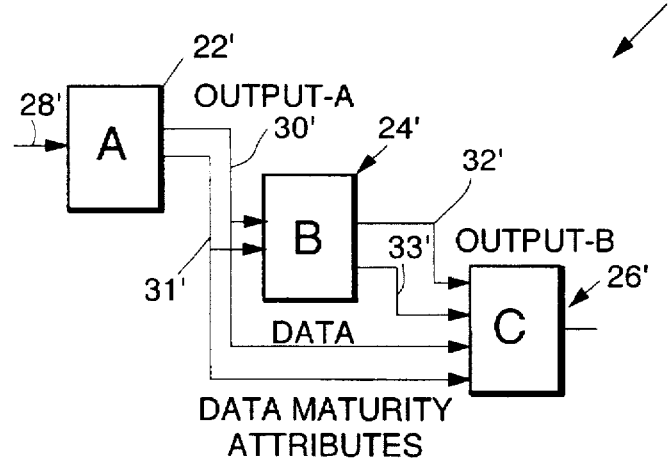
FIG. 3 depicts a model constructed in accordance with the teachings of the present invention.

FIG. 3 depicts a model constructed in accordance with the teachings of the present invention. The model 21' is essentially identical to the model 20' of FIG. 2a with the exception of the addition of lines 31' and 33' which represent the feed forward of data maturity attributes along with the data fed forward from an activity step to a subsequent activity step. In this model 21' preliminary information is fed forward from task A to tasks B and C on line 30' along with a parameter that represents the maturity of the data on line 30' via line 31'. (Lines 30' and 31' are shown bound together to signify that the data maturity information always accompanies the data and is not a separate output per se.) Those skilled in the art will appreciate that this allows for the design of subsequent activity steps taking into account data maturity in the consideration of an appropriate data maturity threshold to begin or continue the subsequent step.

FIG. 4 is a flow diagram of a specific implementation of the process modeling technique of the present invention. The process modeling technique 50 of the present invention includes the steps of first gathering information about the process to be modeled (step 70). Next, specific activity steps within the overall process to be modeled are determined and represented (step 72). At step 74, data maturity thresholds are determined. Typically, the threshold will be a implemented via logical function such as:

If $x \geq T$ then go to step y, else continue where x is the data maturity variable and T is the threshold.

At step 76 a feed forward of preliminary information is represented. And, at step 78, the feed forward of a parameter indicating the maturity of associated preliminary information is represented. The parameter may be implemented as a variable data item which may be stored in a data level maturity file. The data maturity thresholds represent the maturity of information fed forward from one activity step to a subsequent activity step. (It should be understood that a subsequent activity step may, in actuality, involve a feedback of data to a previous step.) Finally, (step 80), the model may be run on a Perceptronics CASE Tool or similar software to estimate or determine by way of simulation time, cost and other useful parameters regarding the process being modeled.

In the specific embodiment step 72 further includes storing or representing information about a first and a second activity step (not shown) using a set of data items. The data items are produced by a primitive, a lowest level activity. The set of data items is used to represent both the first activity step and the second activity step (step 72). The data items are stored in a data maturity file that includes a data item for specifying a maturity attribute of preliminary information be transferred from the first activity step to the second activity step (step 72). The first activity step and the second activity step are represented as including a plurality of activity steps (step 72), each step having a set of corresponding data items with one data item specifying the maturity or completeness of the information stored in all of the data items in the data maturity level file (step 74). Each activity step in the entire process is represented by an activity box, and the flow of data items between the activity steps is represented by an arrow or vector (step 76). In practice, each activity step would typically be represented with multiple inputs and multiple outputs.

A feed forward of preliminary information from the first activity step to the second activity step is described using data items (step 76) which may be implemented using a standard process modeling software package (step 80). The data items are stored in the data maturity level file and the maturity attributes of the data maturity level file are represented by a data item (step 78) that is transferred from the first activity step to the second activity step along an arrow i.e., using a vector representation. When running the model using a process simulation tool (step 80), the data item specifies to the second activity step the maturity or completeness of the input data to be transferred to the second activity step in terms of a percentage.

Thus, the present invention has been described herein with reference to a particular embodiment for a particular application. Those having ordinary skill in the art and access to the present teachings will recognize additional modifications applications and embodiments within the scope thereof.

It is therefore intended by the appended claims to cover any and all such applications, modifications and embodiments within the scope of the present invention.

Accordingly,

What is claimed is:

1. A method for simulating a workflow process having a plurality of activity steps at least two of which are at least partially concurrent including the steps of:

creating a model of the process by:
identifying said activity steps,
representing a transfer of preliminary information from a representation of a first activity step to a representation of a second activity step, and
representing a transfer of a data maturity attribute along with said preliminary information from a representation of a first activity step to a representation of a second activity step and
running said model on a computer program.

2. The invention of claim 1 wherein the computer program is a process simulation tool.

3. The invention of claim 1 further including the step of representing information about a first and a second activity step by set of data items.

4. The invention of claim 3 further including the step of identifying a plurality of activity steps within said first and said second activity step.

5. The invention of claim 3 further including the step of representing each of said activity steps by a data maturity file that includes data items from said set of data items.

6. The invention of claim 3 further including the step of determining data maturity thresholds for each for each of said activity steps.

7. A method for creating a model of a process having a plurality of activity steps including the steps of:

identifying and representing said activity steps;

determining data maturity thresholds for each of said activity steps;

representing a feed forward of preliminary information generated by said activity steps;

representing a feed forward of the data maturity of the preliminary information between activity steps; and running the model on a process simulation tool.

8. A system for simulating concurrent workflow processes comprising:

means for creating a model of a process including:

means for identifying activity steps in said process, means for representing a transfer of preliminary information from a representation of a first activity step to a representation of a second activity step, and means for representing a transfer of a data maturity attribute along with said preliminary information from a representation of a first activity step to a representation of a second activity step;

inputting said model into a process simulation program; and a computer for running said process simulation program.

* * * * *